United States Patent
Barberis et al.

(10) Patent No.: US 6,546,318 B2
(45) Date of Patent: Apr. 8, 2003

(54) RAILWAY TRAIN CONTROL AND COMMUNICATION SYSTEM

(75) Inventors: Dario Barberis, Turin (IT); Roberto Tione, Lauriano (IT); Eric Birot, Paris (FR); Christian Coulange, Chassieu (FR); Daniel Gallavardin, Villeurbanne (FR); Dionisios Ouzounis, Lyons (FR)

(73) Assignees: Sab Wabco S.p.A., Turin (IT); Alstom, Paris (FR)

( * ) Notice: Subject to any disclaimer, the term of this patent is extended or adjusted under 35 U.S.C. 154(b) by 0 days.

(21) Appl. No.: 09/804,392

(22) Filed: Mar. 13, 2001

(65) Prior Publication Data

US 2001/0037167 A1 Nov. 1, 2001

(30) Foreign Application Priority Data

Mar. 30, 2000 (IT) .......................................... TO00A0302

(51) Int. Cl.⁷ ............................. G05D 1/00; G06F 17/00
(52) U.S. Cl. ........................... 701/20; 105/4.3; 246/23; 246/182 A
(58) Field of Search ............................... 701/1, 19, 20; 105/4.3, 35; 343/770, 771, 767; 246/29 R, 23, 63 C, 8, 167 R, 182 A; 188/170, 265; 340/438; 303/71

(56) References Cited

U.S. PATENT DOCUMENTS

| | | | |
|---|---|---|---|
| 3,696,758 A | | 10/1972 | Godinez, Jr. .................. 105/61 |
| 3,772,640 A | * | 11/1973 | Auer et al. .............. 246/122 R |
| 3,974,435 A | | 8/1976 | Elvin .......................... 363/41 |
| 4,523,059 A | * | 6/1985 | Kawamura ...................... 191/6 |
| 4,596,013 A | * | 6/1986 | Tashiro et al. ............... 370/452 |
| 4,702,291 A | * | 10/1987 | Engle ........................... 105/35 |
| 4,708,402 A | * | 11/1987 | Kanda ......................... 303/20 |
| 4,718,351 A | * | 1/1988 | Engle ....................... 105/199.3 |
| 5,558,411 A | * | 9/1996 | Kanjo et al. ................. 188/170 |
| 5,630,565 A | | 5/1997 | Lumbis .................... 246/182 B |
| 5,808,370 A | | 9/1998 | Bezos ......................... 307/9.1 |

FOREIGN PATENT DOCUMENTS

| | | | |
|---|---|---|---|
| DE | 3223779 A1 | * | 6/1982 |
| EP | 0 976 633 A3 | | 2/2000 |
| EP | 0 976 633 A2 | | 2/2000 |
| GB | 292993 | | 1/1929 |

* cited by examiner

Primary Examiner—Thomas G. Black
Assistant Examiner—Ronnie Mancho
(74) Attorney, Agent, or Firm—Sughrue Mion, PLLC

(57) ABSTRACT

The communication and control system is for use in a railway train with at least one engine and a plurality of wagons or carriages. This system comprises first and second bi-directional transmission lines which extend along the train; a main control unit installed on the main engine and connected, in this engine, to both the transmission lines and to brake control devices or systems of the train; and a plurality of slave control units, each of which is installed on a respective wagon or carriage and is connected, in the respective carriage or wagon, to both transmission lines, to solenoid valve units associated with pneumatic brake actuators, as well as two sensor devices associated with the wagon or carriage. The main control unit and the slave control units are arranged to talk to one another through the transmission lines according to a serial protocol. The main unit is arranged to transmit brake control signals to the slave units and to receive and acquire information and state signals coming from the slave control units via the transmission lines. The main control unit and the slave control units are arranged to talk to one another at one working frequency on one of the transmission lines and at a second and different working frequency on the other of the transmission lines.

4 Claims, 2 Drawing Sheets

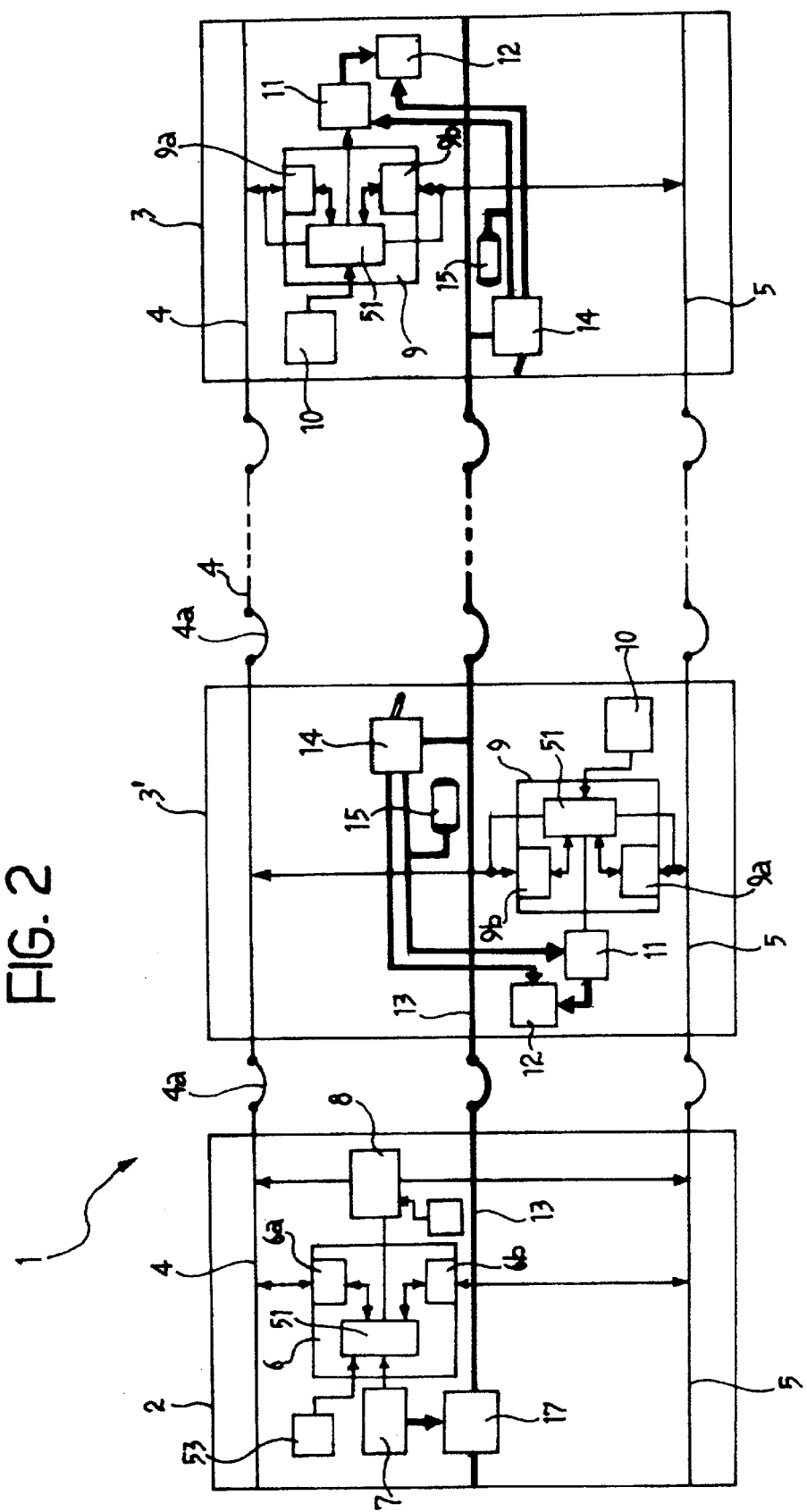

RAILWAY TRAIN CONTROL AND COMMUNICATION SYSTEM

BACKGROUND OF THE INVENTION

The present invention relates to railway train control and communication system for a train comprised of at least one engine and a plurality of wagons or carriages.

A railway train control and communication system of this type is described in earlier European patent application EP-A-0 976 633. In such a system, if the two information transmission lines and electrical energy supply lines are physically arranged in proximity with one another, cross-talk phenomena can occur by the effect of capacitive and/or inductive coupling.

SUMMARY OF THE INVENTION

An object of the present invention is to provide a control and communication system of the above-mentioned type in which this disadvantage can be avoided or at least drastically limited.

This object is achieved according to the invention with a railway train control and communication system the salient characteristics of which are defined in the annexed claim 1.

Further characteristics and advantages of the invention will become apparent from the following detailed description given purely by way of non-limitative example, with reference to the attached drawings, in which:

BRIEF DESCRIPTION OF THE DRAWINGS

FIG. 2 shows a railway train in which one wagon or carriage is disposed reversed with respect to the train of FIG. 1.

DETAILED DESCRIPTION OF THE INVENTION

Figure 1:
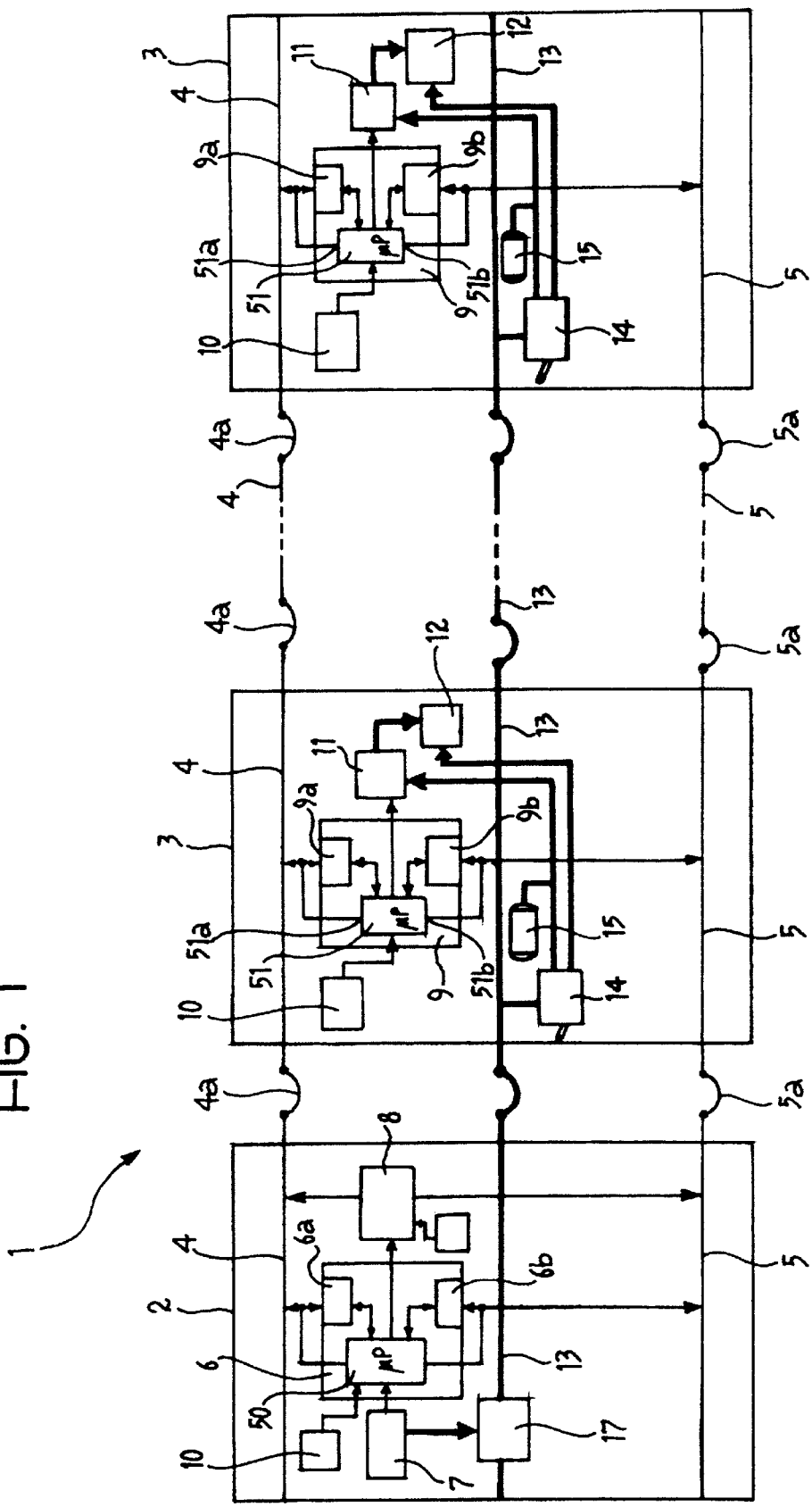
FIG. 1 is a schematic representation of a railway train provided with a control and communication system according to the invention, shown in block diagram form.

In FIG. 1 a railway train comprising a lead or main engine 2, and a plurality of wagons or carriages 3 is generally indicated with reference numeral 1.

The engine 2 is, for example, an electric locomotive, or may be a diesel engine locomotive. The wagons or carriages 3 can be wagons for the transport of goods or carriages for the transport of passengers.

The train 1 of FIG. 1 is provided with a control and communication system comprising first and second bi-directional transmission lines indicated 4 and 5, which extend parallel to one another along the entire train, into the engine and through the various wagons or carriages 3.

The lines 4 and 5 are conveniently constituted, for example, by twisted-pair wire lines. Each of these lines comprise respective sections or portions which extend through the engine and each of the carriages, and which are interconnected with one another between the engine and the next adjacent carriage as well as between the individual carriages, by means of coupling or connector sections 4a and 5a.

As will become apparent more clearly hereinafter, the lines 4 and 5 are utilised for the transmission of electrical energy (power) along the train as well as information or state signals of serial type, using the so-called carrier wave technique.

The control and communication system comprises a main control unit 6 installed on the engine 2 and comprising a micro processor control unit 50 coupled to the lines 4 and 5 by respective transceivers 6a and 6b.

The main control unit 6 is connected to a train braking control device 7 installed on the engine and operable manually or automatically.

On the engine 2, between the lines 4 and 5, is connected a supply device 8 having two outlets able to deliver to these lines the electrical currents necessary for supply of electrical/electronic devices installed on the wagons or carriages 3, which will be described in more detail hereinafter. This supply device is controlled by the microprocessor unit 50, for example in a manner which will be described hereinafter, and may be incorporated in the control unit 6.

On each wagon or carriage 3 there is installed a slave control unit 9, comprising a micro-processor unit 51 with two voltage supply inputs 51a, 51b respectively connected to the lines 4 and 5. The microprocessor unit 51 is also coupled to the transmission lines 4 and 5 by two transceivers 9a and 9b respectively.

The micro processor unit 51 of each slave control unit 9 is therefore able to receive electrical energy necessary for its operation as well as control signals and to receive/transmit information or state signals via lines 4 and 5.

Sensor devices, generally indicated 10, are connected to the control unit 9 in each wagon or carriage 3, and are able to provide the microprocessor unit 51 with electrical signals indicative of conditions or states of on-board devices, such as, for example, solenoid valves of the braking system, and/or electrical signals indicative of the values assumed by certain monitored parameters such as pneumatic braking pressures, the weight acting on the suspension etc.

The control unit 9 of each wagon or carriage 3 is further connected to electro-pneumatic actuator devices 11 such as, for example, solenoid valve units, which control the supply and discharge of compressed air to and from brake cylinders 12 associated with the wagon or carriage.

In a manner known per se the railway train 1 includes a pneumatic braking system including a pneumatic duct 13 which extends along the entire train. On board each wagon or carriage 3, the pneumatic duct 13 is connected to a brake control pneumatic distributor 14 operable to control the delivery of compressed air from (at least) one auxiliary on-board reservoir 15 to the brake cylinders 12 of the wagon or carriage.

On board the engine 2 the pressure of the pneumatic duct 13 is suitably regulated by means of an electro-pneumatic device 17 associated with the control device 7, by withdrawing compressed air provided from pneumatic supply devices known per se and not illustrated.

By way of example, the pneumatic duct 13 is maintained, in normal conditions, at a pressure of 5 bar.

In conventional pneumatic braking systems the braking control information is represented by a reduction of the pressure in the duct 13, for example from 5 bar to 3.5 bar, following which the distributors 14 of the individual carriages or wagons cause the delivery of air under pressure from the associated reservoirs 15 to the brake cylinders 12. In such conventional systems, upon braking, the pressure in the general duct 13 is increased again to the nominal value by feeding air under pressure to the reservoirs 15 of the wagons or carriages 3 via the associated distributors 14.

With a communication and control system according to the invention the braking control information is normally transmitted, no longer by pneumatic means through the general duct 13, but rather by electrical means via serial brake control signals which the main control unit 6 of the engine 2 sends to the slave control unit 9 of the individual wagons or carriages via one of the transmission lines 4 and 5. Following reception of the brake control signals the slave control units 9 of the individual wagons or carriages 3 pilot the solenoid valves 11 in such a way that these latter cause air under pressure to pass from the reservoirs 15 to the brake cylinders 12, bypassing the distributors 14.

In this way the communication and control system according to the invention obviates problems of previous systems related to the propagation of the brake control information by pneumatic means. This is particularly convenient for very long railway trains, or rather those comprising a very large number of wagons or carriages.

After braking, in the subsequent brake-release phase, the supply of air under pressure to the reservoirs 15 of the wagons or carriages is nevertheless ensured by means of the general duct 13.

The presence of the distributor 14 on board each wagon or carriage, however, allows the delivery of brake control information by pneumatic means, via a controlled reduction of the pressure in the general duct 13 in an entirely conventional manner, if the electronic control and communication system associated with the lines 4 and 5 is in a breakdown condition suffering a failure which is not immediately remediable.

In the communication and control system the main control unit 6 on board the engine 2 is conveniently arranged to deliver to the slave control units 9 of the individual wagons or carriages 3 prioritised brake-control signals utilising one of the two communication lines 4 or 5, and periodically to receive from each of the said slave control units 9 information or state signals via the other of the said lines.

The system thus has an intrinsic redundancy thanks to the presence of two communication lines along the entire train.

In practice it can be convenient if the transmission lines 4 and 5 at least in correspondence with their coupling or connector portions 4a, 5a are close to one another. In particular it can be convenient that for interconnection between two wagons or carriages or between the engine and any wagon or carriage, a single connector is utilised through which the electrical continuity for both the lines 4 and 5 is achieved.

For the purpose of eliminating or at least drastically reducing the possibility of the occurrence of cross-talk phenomena between the two transmission lines 4 and 5, the main control unit 6 of the engine 2, and the slave control units 9 of the wagons or carriages 3, are conveniently arranged to talk to one another at a first working frequency on one of the transmission lines, and a second and different working frequency on the other of these transmission lines. Thus, the transceivers 6a and 9a, which in the engine and the various wagons or carriages respectively connect to the transmission line 4, can be tuned to operate at a first working frequency $f_0$ different from the working frequency $f_1$ to which the transceivers 6b and 9b which couple with the other transmission line 5 are tuned. These transceivers may conveniently be of the same type, capable of operating for example at a transmission frequency $f_0 \pm 10\%$ $f_0$. The frequency $f_0$ may for example be 156 K bit/s. Such transceivers may be of the type tuneable to a particular frequency on the basis of signals provided to it by the micro-processor units 50 and 51 respectively associated with them.

For the purpose of avoiding cross-talk phenomena, the transceivers connected to the transmission line 4 can now be, for example, tuned to operate at the frequency $f_0$, whilst the transceivers converted to the transmission line can be tuned to operate at the frequency $f_1 = f_0 + 10\%$ $f_0$.

To simplify the operations involved in forming a train it is suitable that a wagon or carriage can in general be interconnected to the engine or to the other adjacent wagons or carriages equally well in one or the other of its two possible dispositions or orientations at 180° from one another. To this end it is suitable that the transmission lines 4 and 5 and the apparatus connected to it does not interfere with this possibility of interconnecting one carriage or wagon in one or the other of its two possible orientations. The sections of the lines 4 and 5 which cross from one carriage or wagon must therefore, at least in there end sections, be symmetrically disposed in such a way as to allow the achievement of two continuous and separate transmission lines even if one or more carriages or wagons is or are interconnected in the train with a reversed disposition as in the case of the carriage 3' of FIG. 2.

However, in order to ensure the operativity of the system with wagons or carriages connected either in one or the other disposition, and wishing to operate at two different working frequencies on one and the other transmission line, it is not possible to predetermine once and for all the working frequency for the two transceivers 9a and 9b of each wagon or carriage. In fact in the carriage 3' of FIG. 2, which is in a reverse orientation with respect to the corresponding carriage of FIG. 1, the transceiver 9b will be connected to the line 4 rather than to the line 5 as in the case of FIG. 1.

In the system according to the invention, each time that a start up initialisation phase is actuated by means of a command device 53 connected to the micro-processor unit 50, the main control unit 6 installed on the engine can now be conveniently arranged to pilot the supply device 8 in such a way that this latter initially supplies electrical energy only to a predetermined line of the two transmission lines 4 and 5, for example the line 4, which in subsequent operation is assigned a pre-selected working frequency, for example the frequency $f_0$. The slave control units 9 installed on-board the various wagons or carriages are now arranged to be able to identify, in the said initialisation phase, through which of the two transmission lines they initially receive electrical energy supply, and therefore to talk to the main unit 6 of the engine 2 at the said pre-selected working frequency $f_0$ on the thus-identified line, and at the other working frequency $f_1 = f_0 + 10\%$ $f_0$ on the other transmission line.

Once the allocation of the working frequency to the two transmission lines is achieved, the operativity of the system is allowed independently of the disposition in which the individual carriages or wagons have been interconnected with one another in the composition of the train.

Naturally, the principle of the invention remaining the same, the embodiments and details of construction can be widely varied with respect to what has been described and illustrated purely by way of non-limitative example, without by this departing from the ambit of the invention as defined in the annexed claims.

What is claimed is:

1. A communication and control system for a railway train which comprises at least one engine and a plurality of wagons or carriages, including first and second bi-directional information transmission lines which extend along the train;

a main control unit installed on said engine and connected, in said engine, to both said transmission lines to transmit and receive information to and from both of said transmission lines and to devices or systems for controlling braking of the train;

a plurality of slave control units, each of which is installed on a respective wagon or carriage and is connected, in the respective wagon or carriage to said transmission lines, to solenoid valve units associated with pneumatic brake actuators, as well as to sensor devices associated with the wagon or carriage;

the main control unit and the slave control units being arranged to talk to one another via said transmission lines according to a predetermined serial protocol;

the main control unit being arranged to transmit to the slave control units serial brake control signals and to receive and acquire information or status signals, also of serial type, coming from said slave control units via said transmission lines;

the main control unit and the slave control units being arranged to talk to one another at one working frequency on one of said transmission lines and at a second and different working frequency on the other of said transmission lines.

2. A system according to claim 1, further comprising electrical energy supply means (8) installed on said at least one engine and connected to both said transmission lines to distribute electrical supply energy along the train via said lines in particular to supply energy to the slave control units;

the main unit being arranged such that, each time that an initialisation phase is actuated, said energy supply means is piloted in such a way that energy is initially supplied only to the first of said transmission lines such that the main unit assigns for the subsequent operation a pre-selected working frequency pre-selected from said first and second frequency;

each slave control unit being operable to identify, in said initialisation phase, through which of said transmission lines it initially receives electrical energy supply, and then to talk to the main unit at said pre-selected working frequency on said line thus identified, and at the other working frequency on the other transmission line.

3. A system according to claim 2, in which the main control unit and the slave control units each comprise a respective pair of transceivers respectively coupled to one or the other transmission line and programmed to operate at respective different working frequencies.

4. A system according to claim 3 in which the transceivers of the main unit and of the slave control units are structurally identical.

* * * * *